April 28, 1970
R. B. BERTOLASI
RANDOM GAP PULSING SYSTEM FOR EDM

Filed July 27, 1966

INVENTOR.
Robert B. Bertolasi
BY
Harness, Dickey & Pierce
ATTORNEYS

United States Patent Office 3,509,305
Patented Apr. 28, 1970

3,509,305
RANDOM GAP PULSING SYSTEM FOR EDM
Robert B. Bertolasi, Rockford, Ill., assignor, by mesne assignments, to Amsted Industries Incorporated, Chicago, Ill., a corporation of Delaware
Filed July 27, 1966, Ser. No. 568,169
Int. Cl. B23p 1/08
U.S. Cl. 219—69
10 Claims

ABSTRACT OF THE DISCLOSURE

An electrical discharge machine for eroding material from a conductive workpiece by passing successive pulses through an ionizable gap defined between an electrode tool and the workpiece, in which a random gap pulsing method is employed to increase the speed at which material is removed from the workpiece. Independent sources of gap ionizing potential and material eroding energy are selectively coupled across the gap through the operation of respective switches which are controlled by a pulse generating means which, in turn, is controlled by a gap voltage detection means. The pulse includes a bistable circuit which is switched to a first state by the detection means when the gap is deionized, thereby actuating the first of the switches to couple the gap ionizing potential across the gap. It also includes a monostable pulse generator which is triggered by the detection means to provide a pulse of predetermined duration when the gap becomes ionized. This pulse switches the bistable circuit to its second state to deactuate the first switch and also actuates the second of the switches to couple the source of material eroding energy across the gap. A gate, which is inhibited or opened when the voltage across the gap falls below a predetermined low level, may be connected between the monostable pulse generator and the second switch to assure that the material eroding energy is cut-off in the event of a gap short circuit or the like.

---

This invention generally relates to the machining of metals and other conductive materials by the utilization of spark discharge between a workpiece and a tool electrode, and more specifically to an improved method and apparatus for supplying electrical energy to a work gap between a workpiece and the tool electrode to effect removal of material from the workpiece by an electrical discharge machining process.

In electrical discharge or spark machining processes, commonly referred to as EDM process, a tool electrode and workpiece to be machined are spaced, one from the other, to form a work gap. The tool electrode and workpiece are associated with an electrical control circuit including a source of electrical energy whereby an electrical discharge or arc is produced across the work gap for removing metal from the workpiece in a predetermined configuration. The work gap between the tool electrode and the workpiece is generally occupied by a dielectric medium as, for example, a dielectric fluid, and the electrical arc utilized in the machining process passes through this medium. In accomplishing the erosion of metal from the workpiece by the electrical arc, the gap must first be ionized to provide a path through the work gap, commonly known as ionizing the gap, and then material removing energy is passed through the gap to actually machine the workpiece.

In performing the electrodischarge machining process, it has been found that the most efficient use of the electrical energy being supplied to the gap occurs when the gap is initially supplied with a high voltage, high impedance, low current and low power source for the purpose of ionizing the gap and subsequently with electrical energy having the characteristics of low voltage, high current, and high power to supply the material removing energy. In this way the gap is supplied with electrical energy in which the energy is most efficiently transferred due to the close matching of the impedance of the gap to the source of electrical energy. Accordingly, it is desirable to initially ionize the gap with a power source having the electrical characteristics described above for ionizing purposes and thence to supply the material removing energy to the gap in accordance with the second set of characteristics described above.

The primary aim of the present invention is to provide a highly efficient power supply for supplying successive pulses through an ionizable work gap defined between a conductive workpiece and an electrode tool to erode or remove material from the workpiece, in which the pulse repetition rate is optimized.

A more specific object of this invention is to provide a power supply of the foregoing-type in which independent sources of gap ionizing potential and material eroding energy are selectively coupled across the work gap in dependence upon the state of ionization of the work gap. A detailed related object is to provide an electrical discharge machining power supply in which the state of ionization of the work gap is detected, so that a high voltage, low current source is coupled across the work gap only when the work gap is deionized and a low voltage, high current source is coupled across the work gap only when the work gap is ionized.

Another object of the present invention is to provide a current cut-off circuit for a power supply of the foregoing-type, so that the supply of material eroding energy is interrupted should the gap voltage drop below some predetermined low level while material eroding energy is being applied to the workpiece. A related object is to provide a per pulse current cut-off circuit for such a power supply so that gap short circuit protection is afforded on a per pulse basis.

Still another object of the present invention is to provide a power supply of the foregoing-type which is relatively simple and economical and which may be used in a wide variety of new and existing electrical discharge machines.

Further objects, features, and advantages of this invention will become apparent from a consideration of the following description, the appended claims and the accompanying drawings in which:

Figure 1:
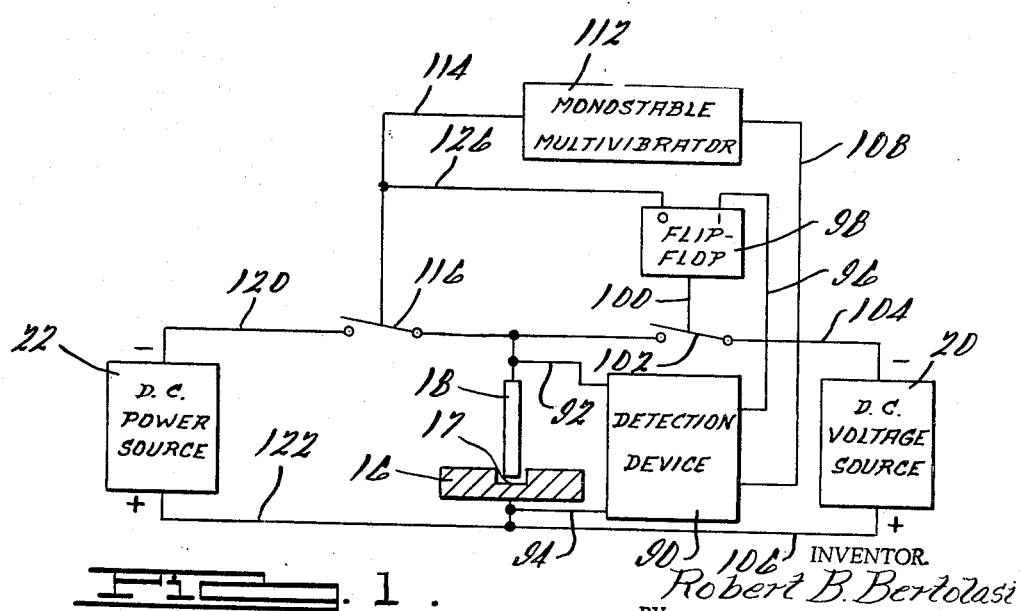
FIGURE 1 is a schematic diagram illustrating a basic embodiment of the present invention.

Referring now to the drawings, and particularly to FIGURE 1, there is representatively illustrated an electrodischarge machining system including a work gap 17 formed by the spacing between a workpiece 16 and a tool electrode 18. As stated above, it has been found that the use of a single power supply to both break down the gap, referred to as ionization of the gap, and also provide the energy to erode the material from the workpiece results in an inefficient operation of the power supply. This inefficiency arises due to the fact that a relatively large source of power having a high voltage capability is required to perform both functions, thus inefficiently utilizing the power supply during a portion of the cycle. Accordingly, the work gap 17 is adapted to be selectively connected across a pair of sources of electrical energy 20 and 22, the source 20 being a high voltage, low power D.C. source for providing the potential required to ionize or break down the work gap 17 and the source 22 being a low voltage, high power D.C. source for providing the energy required to erode material from the workpiece 16. To assure that the work gap will be ionized, the source of ionizing potential 20 has an output voltage on the order of 120–150 volts. On the other hand, once the work gap has been ionized, considerably less voltage is required to assure that it will remain ionized. Indeed, in the usual situation, only about 18–32 volts are required for this purpose. Therefore, the source of material eroding energy may suitably have an output voltage of only about 40–50 volts, which is well below the potential required to initially ionize the gap, but still safely above the potential required to maintain the gap in an ionized condition as material eroding energy is supplied to the workpiece.

The workpiece 16 and tool electrode 18 are mounted in the normal manner in an electro-discharge machine setup and are preferably submerged in a dielectric coolant. The dielectric coolant is adapted to carry the metallic particles removed from the workpiece 16 and also maintain the surface of both the workpiece 16 and tool electrode 18 below melting temperature.

In the normal situation, the position of the electrode 18 is automatically controlled relative to the workpiece 16 by means of a servo mechanism (not shown) in such a manner that the gap 17, during normal cutting operations, remains rather constant. For this purpose any of the known power feed servo mechanisms may be utilized and any of the conditions of the work gap 17 may be sensed to control the operation of the power feed servo system, as for example, average power, average voltage, peak voltage, etc. To selectively couple the sources 20 and 22 across the work gap 17, there are switches 102 and 116, which are connected in series between the sources 20 and 22, respectively, and the work gap 17 through conductors 104, 106 and 120, 122. These switches are sequentially operated, as described in more detail hereinafter, so that the switch 116 is closed only after the gap has been ionized by the high voltage impressed thereacross through the switch 102. Once the gap has been ionized, the switch 102 is opened and material eroding energy is applied to the workpiece 16 through the switch 116. As will be appreciated, the switches 102 and 116 may take many forms. For example, they may suitably by transistors or vacuum tubes.

Since the closing of the switch 116 is delayed until after the gap has been ionized, the high, open circuit impedance thereof decouples the low voltage, high power D.C. source 22 from the gap circuit while the work gap 17 is being ionized. This decoupling operation has an inherent characteristic of presenting a high impedance load for the initial ionization pulse fed from the high voltage, low power voltage source 20, thereby enhancing the breakdown characteristics of the gap. It is to be noted that the high impedance of the high oltage source 20 may be chosen to be closely matched to the deionized impedance of the gap 17, thereby assuring an efficient transfer of power to the gap 17 from the high voltage source 20. Once the gap has ionized the switch 102 is opened and the switch 116 is closed. The ionized gap presents a low impedance to the source. Accordingly, an efficient transfer of energy from the low voltage, high power source 22 is effected by matching its impedance to the low impedance presented by the ionized gap.

In keeping with the present invention, and in contrast with other EDM power supplies in which independent sources of gap ionizing potential and material eroding energy are employed, the switches 102 and 116 are operated in strict dependence upon the state of ionization of the gap, so that there is no predetermined timing pattern that must be followed. As a result, the repetition rates of the gap ionizing pulses and of the material eroding energy pulses are automatically optimized.

To carry out the invention a detection device 90 is connected across the gap by means of a pair of conductors 92, 94 to sense the ionization or deionization conditions of the gap and produce characteristic output signals in accordance therewith. The state of ionization of the gap is indicated by the voltage existing thereacross. More specifically, a deionized gap is characterized by a zero or reverse voltage condition, while an ionized gap is characterized by a voltage that is appreciably lower than the voltage existing across the gap prior to its ionization. Accordingly, the detection device may take the form of any of the detection systems known in the art which are sensitive to these various conditions of the gap, and which are capable of producing characteristic output signals in accordance therewith. In the situation where the gap has been deionized or has fallen to the deionized state, a signal is produced within the detection device 90 and impressed on an output conductor 96 which is connected to a flip flop unit 98. The signal on the conductor 96 sets the conditions in the flip flop unit 98 such that a signal is produced on the conductor 100 which is capable of closing the switch 102.

The closing of the switch 102 impressed the high voltage source 20 across the gap 17 by means of the conductors 104, 106 thereby commencing the ionization process of the gap. When the gap reaches the predetermined ionized state, the detection device senses this new ionization condition and produces an output signal on a conductor 108. This latter signal is impressed on a monostable pulse producing means 112, which may take the form of a single shot multivibrator, to trigger the pulse producing means and thereby produce an output pulse of specified duration. This output pulse is impressed on a conductor 114 which is connected to the switch 116, thereby closing the switch 116 to impress the high power source 22 on the gap 17 by means of the conductors 120, 122.

The output pulse from the single shot multivibrator 112 is also fed to the reset side of the flip flop unit 98 by means of a conductor 126 to reset the flip flop 98 in response to the output pulse, and thus open the switch 102 at the approximate time the switch 116 is closed. The pulse on the conductor 114 will last a predetermined duration depending on the reactive elements of the monostable multivibrator and thence will open switch 116 at the completion of the pulse. The gap then commences deionizing and, when this deionization process reaches a certain stage, the relaxed or zero voltage state, the detection device 90 will produce an output pulse on the conductor 96 to set the flip flop unit 98, thereby closing the switch 102. In this way this pulsing process is repeated. By utilizing the method of pulsing the gap 17, the cutting action of the system is greatly enhanced due to the fact that the gap 17 is ionized and metal removing energy is fed thereto at the fastest possible repetition rate.

It is to be noted that the gap 17 will not fire and the switch 116 will not connect the high power source 22 to the gap until such time as the conditions within the gap are conducive to proper metal removal. The ultimate result is a better finish of the workpiece and surface damage of the workpiece is greatly reduced. Also, in processes of the electro-discharge machining type, the "on" time of the pulse to the gap as related to the "off" time, commonly known as the duty cycle, is very important. Different materials being utilized in the workpiece 16 require varying pulse duration for the best possible results. Accordingly, close control of the pulses being fed to the gap 17 is highly desireable.

Figure 2:
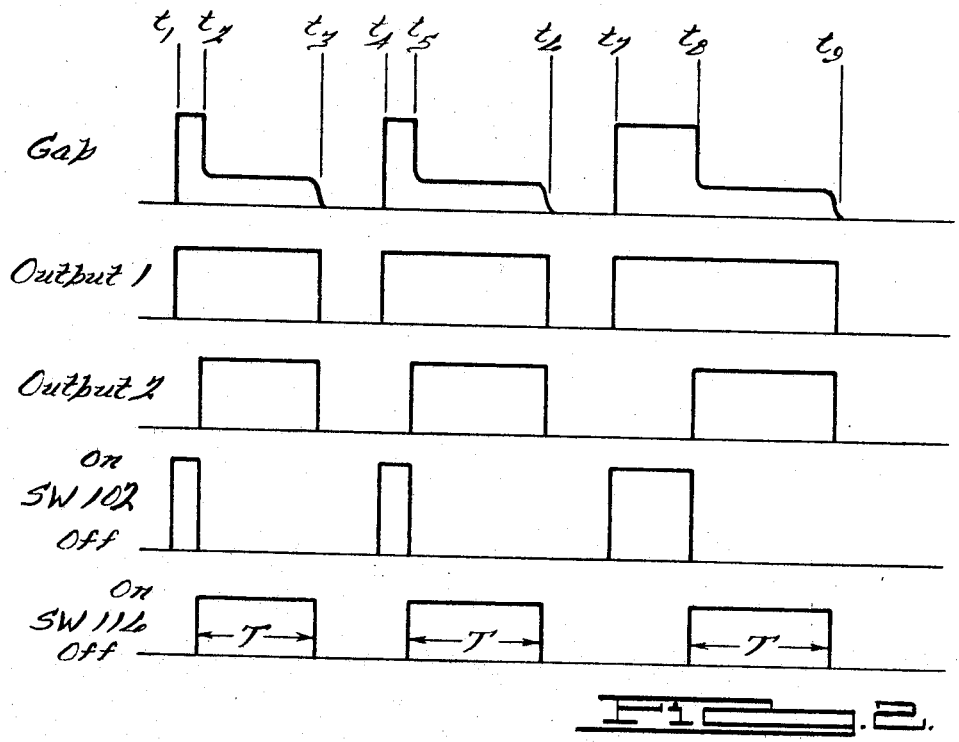
FIGURE 2 is a voltage versus time diagram of the operation of the switches and gap of FIGURE 1.

Referring now to FIGURE 2, there is a timing diagram for the operation of the circuit of FIGURE 1, and illustrating the timed operation of the switches 102 and 116 in conjunction with the gap voltage. With the detection device producing a pulse to set the flip flop 98, a pulse from the flip flop 98 is impressed on the switch 102 at time T1 and persists until time T2. During this period the gap voltage breaks down as the gap commences the ionization process and, when sufficient ionization has taken place, the detection device 90 will pulse the single shot multivibrator 112 to produce an "on" pulse for the switch 116 at time T2. The "on" pulse for the switch 116 is of a predetermined duration time T, the lapse of which time causes the switch 116 to open, so that the gap commences its deionization process at time T3.

Between the times T3 and T4, the ionized portion of the gap discharges thus lowering the gap voltage to zero. After a selectable short time delay (approxamately 1 to 100 microseconds), used to insure clearance of contamination from the immediate discharge vicinity and necessary to prevent reionization of the same channel, the detection device will produce an output signal indicative of the deionization of the gap, thereby setting the flip flop 98 thus closing the switch 102 at time T4. However, between the times T4 and T5 the gap requires a longer time to ionize due to certain variable conditions within the gap such as, for example, the slow reaction of the servo mechanism, certain changes in characteristics of the gap, or the like. Accordingly, the gap commences deionization just before time T5 and at time T5 the detection device will produce the output signal to the pulse multivibrator 112. It is to be understood that the timing chart of FIGURE 6 is described herein purely for illustrative purposes and is intended to cover only three possible conditions in the work gap.

The pulsing of the multivibrator 112 produces an output pulse to energize the switch 116, thereby closing the switch 116 at time T5. The closed time of the switch 116 is determined by the impedance parameters of the multivibrator and is a constant for any given set of impedances. Between the times T6 and T7, a delay is experienced similar to the delay occurring between the times T3 and T4 to permit the clearing of the gap. Again, this may be due to certain gap conditions which vary during the machining process. At times T7 the switch 102 is closed due to the setting of the flip flop unit 98 by a pulse from the detection device 90 and in this situation the gap is illustrated as breaking down or ionizing at time T8, thereby pulsing or triggering the multivibrator 112 through the detection device 90. When triggered, the multivibrator almost immediately produces a pulse which, as above-mentioned, is of a predetermined duration and which is applied to close the switch 116. Accordingly, the switch 116 is closed at the time T8 and remains closed until the time T9.

Figure 3:
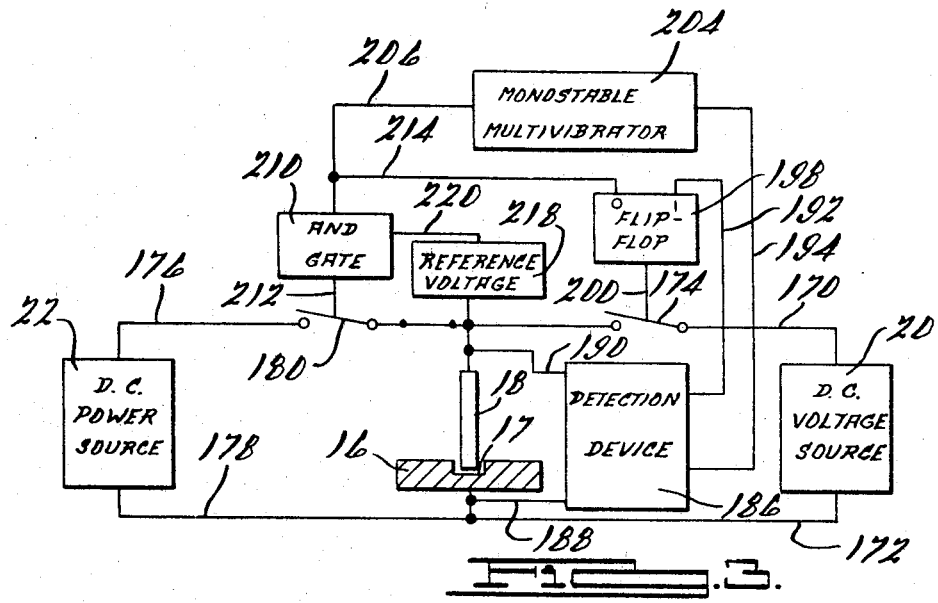
FIGURE 3 is a schematic diagram of a further embodiment of the present invention, including a current cut-off circuit in combination with the basic power supply shown in FIGURE 1.

The basic power supply of FIG. 1 may include a cut-off circuit for interrupting the application of material eroding energy to the workpiece 16 in the event of a gap short circuit or the like. Preferably, the cut-off circuit provided is responsive on a per-pulse basis to assure the most effective gap short circuit protection. Referring now to FIGURE 3, it is seen that a per-pulse gap short circuit protection may be provided for the basic power supply by adding an "and" gate 210 and a reference voltage circuit 218 thereto. As in the previous situation a high voltage source 20 is connected to the tool electrode 18 and workpiece 16 by means of a plurality of conductors 170 and 172, and a switch 174. The high power source 22 is similarly connected to the load gap 17 by means of a pair of conductors 176, 178, and a second switch 180. The voltage across the gap 17 is sensed by a detection device 186 which is connected thereto by means of a pair of conductors 188 and 190. The detection device is similar to the detection device described in conjunction with FIGURE 1, that is, the device 186 will produce an output signal on a conductor 192 which is indicative of a deionization level in the gap 17 and a second pulse will be produced on a conductor 194 which is indicative of an ionization level of the gap 17. The output pulse on conductor 192 is fed to a flip flop unit 198 which sets the flip flop to a first state and a pulse is produced on a conductor 200 to close the switch 174 due to the pulse on conductor 192.

With the switch 174 closed, the high voltage source 20 impresses a voltage across the gap 17 to commence the ionization process. When this ionization reaches a predetermined level, the pulse on conductor 194 is fed to a monostable pulse circuit 204, which produces a timed output pulse on conductor 206. The output pulse on conductor 206 is fed to the "and" gate 210 which is connected in controlling relation with the switch 180 by means of a conductor 212. The output pulse from the multivibrator circuit 204 is also fed to the flip flop unit 198 by means of a conductor 214 which acts to reset the flip flop unit to its second stable state, thereby opening switch 174. The switch 174 remains open until such time as a pulse is generated in the detection device 186 which is indicative of a deionization condition in the gap 17.

If all other inputs to the "and" gate 210 are "on", the switch 180 will be closed and the high power source 22 will be connected to the gap 17 through the leads 176 and 178.

The reference voltage circuit 218 is connected to sense the gap voltage 17 and is effective when the gap voltage drops below a predetermined low level to apply an "off" pulse to the "and" gate 210 through the conductor 220. The "off" pulse provided by the reference voltage circuit 218 inhibits the operation; of the "and" gate 210, thereby opening the switch 180. At such time as the short circuit condition at gap 17 is corrected and the voltage rises above the preselected level, the reference voltage circuit 218 will produce an "on" pulse on the conductor 220, thereby enabling the "and" gate 210. From the foregoing, it will now be clear that the present invention provides a new and improved power supply for supplying a succession of pulses through a gap defined between an electrode and a workpiece to machine the workpiece, in which independent sources of gap ionizing potential and material eroding energy are employed to provide the most efficient transfer of energy from the sources to the gap. Moreover, it will be understood that the independent sources are selectively coupled across the gap in strict dependence upon the ionization state of the gap, thereby automatically optimizing the repetition rate of the pulses supplied. Finally, it will be seen that the power supply may have a cut-off circuit associated therewith to provide gap short circuit protection, and that the cut-off circuit may be effective on a per-pulse basis.

What is claimed is:

1. In an electrical discharge machine for eroding material from a workpiece by passing successive pulses through an ionizable work gap defined between an electrode tool and the workpiece, a system for supplying said pulses comprising the combination of a first switch means for selectively coupling a source of ionizing potential across said work gap, a second switch means for selectively coupling a source of material eroding energy across said work gap, a detection means coupled across said gap for providing a first output signal when the gap is ionized, and a pulse generating means coupled to said second switch means and responsive to said first output signal from said detection means for actuating said second switch means to couple said source of material eroding energy across said work gap only when said work gap is ionized.

2. The system of claim 1 wherein said pulse generating means includes a monostable pulse generator which is coupled to said second switch means and which is triggered by said first output signal to actuate said second switch means.

3. The system of claim 1 wherein said detection means further provides a second output signal when the work gap is deionized, and wherein said pulse generating means is coupled to said first switch means and is responsive to said second output signal for actuating said first switch means to couple said source of ionizing potential across the work gap when the work gap is deionized.

4. The system of claim 3 wherein said pulse generating means includes a bistable circuit means connected in actuating relation with said first switch means and having a first state and a second state, said bistable circuit means being coupled to said detection means and being switched to said first state in response to said second output signal for actuating said first switch means and to said second state in response to said first output signal for deactuating said first switch means.

5. The system of claim 2 wherein said pulse generating means includes a monostable pulse generator coupled to said second switch means, a bistable circuit means coupled to said first switch means and having a first and second state, first coupling means coupling said detection means to said bistable means for switching said bistable means to said first state and actuating said first switch means in response to said second output signal, second coupling means coupling said monostable pulse generator with said detection means for actuating said second switch means in response to said first output signal, and third coupling means coupling said monostable pulse generator and said bistable means for switching said bistable means to said second state and deactuating said first switch means in response to the actuation of said second switch means.

6. The system of claim 5 wherein said source of ionizing potential has a relatively high voltage, low current characteristic and said source of material eroding energy has a relatively low voltage, high current characteristic.

7. The system of claim 6 wherein said gap has a varying ionization voltage point, said source of ionizing potential provides a voltage which is greater than the ionization voltage point of the gap, and said source of material eroding energy provides a voltage which is lower than the ionization voltage point of the gap.

8. The system of claim 1 further including means coupled to at least one of said electrode tool and workpiece and responsive to a drop in the voltage across the gap to a point below a predetermined level to provide an inhibiting signal, and gate means coupled between said pulse generating means and said second switch means and responsive to said inhibiting signal for deactuating said second switch means.

9. The system of claim 3 further including means coupled to at least one of said electrode tool and workpiece and responsive to a drop in the voltage across the gap to a point below a predetermined level to provide an inhibiting signal and gate means coupled between said pulse generating means and said second switch means and responsive to said inhibiting signal for deactuating said second switch means.

10. The system of claim 5 further including a gate circuit coupled between said monostable pulse generator and said second switch means, and a reference voltage circuit coupled between said electrode tool and said gate circuit for supplying a signal to inhibit said gate circuit in response to a drop in the voltage across said gap to a point below a predetermined level to thereby deactuate said second switch means in the event of a gap short circuit and the like.

References Cited
UNITED STATES PATENTS

| | | |
|---|---|---|
| 3,052,817 | 9/1962 | Branker. |
| 3,231,782 | 1/1966 | Ferguson. |
| 3,328,635 | 6/1967 | Webb. |

JOSEPH V. TRUHE, Primary Examiner

R. F. STAUBLY, Assistant Examiner

Notice of Adverse Decision in Interference

In Interference No. 97,991, involving Patent No. 3,509,305, R. B. Bertolasi, RANDOM GAP PULSING SYSTEM FOR EDM, final judgment adverse to the patentee was rendered Oct. 8, 1974, as to claims 1–10.

[*Official Gazette May 6, 1975.*]

Disclaimer and Dedication 3,509,305.—*Robert B. Bertolasi*, Rockford, Ill. RANDOM GAP PULSING SYSTEM FOR EDM. Patent dated Apr. 28, 1970. Disclaimer and dedication filed Sept. 19, 1974, by the assignee, *Amsted Industries Incorporated*.

Hereby disclaims and dedicates to the Public the remaining term of said patent.

[*Official Gazette September 2, 1975.*]